United States Patent [19]

Toland

[11] 4,039,725

[45] Aug. 2, 1977

[54] PLASTICIZED SULFUR AS AN ADHESIVE AND LAMINATED CONDUIT MADE THEREFROM

[75] Inventor: William G. Toland, San Rafael, Calif.

[73] Assignee: Chevron Research Company, San Francisco, Calif.

[21] Appl. No.: 625,397

[22] Filed: Oct. 24, 1975

Related U.S. Application Data

[63] Continuation of Ser. No. 518,435, Oct. 29, 1974, abandoned.

[51] Int. Cl.$^2$ .................. B32B 21/04; B32B 9/04
[52] U.S. Cl. .................. 428/537; 428/538; 428/491; 428/411; 423/567 R; 156/325; 260/79
[58] Field of Search .................. 428/36, 537, 538; 156/325, 326, 334; 423/567; 106/287 SC; 260/79

[56] References Cited

U.S. PATENT DOCUMENTS

| | | | |
|---|---|---|---|
| 2,169,814 | 8/1939 | Patrick | 260/79.1 |
| 3,055,278 | 9/1962 | Kinneman, Jr. | 156/184 |
| 3,323,962 | 6/1967 | Sprengling et al. | 156/184 |
| 3,384,609 | 5/1968 | Signouret et al. | 260/79 |
| 3,465,064 | 9/1969 | Signouret | 156/333 |
| 3,674,525 | 7/1972 | Louthan | 260/79.5 C |
| 3,823,019 | 7/1974 | Dale et al. | 106/287 SC |
| 3,855,054 | 12/1974 | Shapiro et al. | 428/473 |
| 3,935,352 | 1/1976 | Toland | 428/95 |

OTHER PUBLICATIONS

Polymeric Sulfur and Related Polymers, Tobolsky et al., Interscience Publishers, 1965, ch. 5 & 6, pp. 87–115.

*Primary Examiner*—George F. Lesmes
*Assistant Examiner*—William R. Dixon, Jr.
*Attorney, Agent, or Firm*—D. A. Newell; John Stoner, Jr.; W. Keith Turner

[57] ABSTRACT

A composition comprising plasticized sulfur wherein the composition is prepared by steps including heating the plasticized sulfur to a temperature between 160° C and 220° C and then cooling the hot plasticized sulfur in liquid form below its normal melting point (freeze point) to thereby obtain a liquid, tacky, plasticized sulfur. Preferably the plasticized sulfur is brought to a temperature between about 170° C and 210° C and then cooled. The composition is useful as an adhesive and is useful as a binder in preparing conduit or pipe from laminated layers of paper-like material. The composition is also useful in preparing structures or structural members.

7 Claims, No Drawings

PLASTICIZED SULFUR AS AN ADHESIVE AND LAMINATED CONDUIT MADE THEREFROM

This is a continuation of application Ser. No. 518,435, filed Oct. 29, 1974 now abandoned.

BACKGROUND OF THE INVENTION

The present invention relates to plasticized sulfur prepared by specified heating and cooling. The plasticized sulfur is a good adhesive and can be used as a bonding agent in making pipe out of layers of paper.

Plasticized sulfur has been disclosed in various references, for example by J. I. Jin in "Chemistry of Plasticized Sulfur", Petroleum Division, A.C.S. Symposium, Vol. 19, No. 2, March 1974, pp. 234–241, and by C. Kinney Hancock in "Plasticized Sulfur Compositions for Traffic Marking", Industrial and Engineering Chemistry, Vol. 46, No. 11, November 1954, pp. 2431–2435. Exemplary patents disclosing plasticized sulfur (and heating temperatures at which the plasticized sulfur is formed) include U.S. Pat. No. 2,169,814, "Bonding and Coating Product" (heating temperatures of 150°–160° C); U.S. Pat. No. 3,306,000, "Construction Method" (heating temperatures of 135–1751C); U.S. Pat. No. 3,316,115, "Marking Composition" (heating temperature of 160° C); U.S. Pat. No. 3,371,072, "Sulphur Resins" (heating temperatures of 100°–200° C, preferably 110°–160° C); U.S. Pat. No. 3,384,609, "Plasticized Sulphur" (heating temperatures of 120°–250° C, preferably 140°–160° C); U.S. Pat. No. 3,434,852, "Plasticized Sulfur Compositions" (heating temperatures of 50°–250° C, preferably 100°–200° C, and exemplary temperatures of 130°–170° C); U.S. Pat. No. 3,447,941, "Sprayable Sulfur Road Marking Compositions" (heating temperature of 150° C); U.S. Pat. No. 3,453,125, "Plasticized Sulfur Compositions" (heating temperatures of −20°–250° C and exemplary temperatures of 138°–170° C); U.S. Pat. No. 3,459,717, "Sulfur-Based Plastic Composition" (heating temperatures of 115°–200° C, preferably 140°–170° C); U.S. Pat. No. 3,465,064, "Adhesive Plasticised Sulphur Containing an Olefine Polymer" (heating temperatures of 100°–200° C, preferably 140°–150° C); U.S. Pat. 3,560,451, "Plastic and Nonflammable Sulfur Composition" (heating temperatures of 120°–180° C, preferably 140°–160° C); U.S. Pat. No. 3,640,965, "Thermoplastic SulfurContaining Polymers"; U.S. Pat. No. 3,674,525, "Plasticized Sulfur Compositions" (heating temperatures of 50°–250° C and exemplary temperature of about 155° C); U.S. Pat. No. 3,676,166, "Plasticized Sulfur Compositions" (heating temperatures of 75°–400° F, preferably 250°–350° F, and exemplary temperature of 300° F); U.S. Pat. No. 3,734,753, "Plasticized Sulfur Compositions" (heating temperatures of 118°–250° C, preferably 150° C); and U.S. Pat. No. 3,787,276, "Corrugated Cardboard Containing Sulphur Foam" (heating temperature of 110° C); also Ser. No. 286,627, now U.S. Pat. No. 3,823,019, "Mine Wall Coating" (heating temperatures of 240°–320° F, preferably 275°–320° F), which application has been offered for license by the U.S. Bureau of Mines, discloses plasticized sulfur compositions.

As can be seen from the examples in the above patents, temperatures which are suggested by the patents for heating or carrying out a reaction to obtain the plasticized sulfur compositions are generally about 150° C (302° F). U.S. Pat. No. 3,734,753 thus discloses at Col. 2, line 50, with respect to preparation of plasticized sulfur compositions: "It is preferable to maintain the temperature of the reaction mixture at about 150° C since pure sulfur becomes viscous at 160° C and higher temperatures raise the cost of processing."

"Elemental Sulfur," edited by B. Meyer, Interscience Publ. (1965) discloses in Chapter 5 the sharp increase in sulfur viscosity at about 159° C. Chapter 8 of "Elemental Sulfur" discloses as follows:

Both the arsenic-modified and phosphorus-modified systems are dark red in color, have objectionable odors, and tend to recrystallize when exposed to light and air. Arsenic-sulfur systems are more stable and such materials have been fabricated into a variety of products including lenses, prisms, tubes, and fibers.

Polymeric sulfides and polysulfides are more promising modifiers for elemental sulfur, tending to stabilize the material in a plasticized form. These materials, on heating with sulfur to temperatures above its polymerization point (159° C), form viscous liquids which on cooling show distinct polymeric properties. These compositions recrystallize elemental sulfur only after comparatively long periods of time, depending upon the concentration of polysulfide polymers used . . . Compositions having as little as 10–15% of the polymer [ethylene tetrasulfide], after heating to 160°–175° C, remain in a polymeric form several days before completely recrystalling. Larger quantities of the ethylene tetrapolysulfide give pliable materials which remain largely unchanged in properties for several weeks, following which hardening occurs on the recrystallization of sulfur.

Mixtures of ethylene polysulfides with sulfur have been studied extensively to Tobolsky and coworkers [J. of Polymer Sci. A2, 1987 (1964)]. Both linear and cross-linked systems have been produced. Each produces extensive supercooling of sulfur. Systems containing as much as 40% supercooled liquid sulfur have remained free of crystallization for over three years.

In one of its embodiments, the present invention is also concerned with a method for preparing laminated conduit or pipe. Exemplary prior art patents in this area include U.S. Pat. Nos. 1,943,501, "Manufacture of Paper Tubes", for example shotgun sheels; 3,055,278, "Reinforced Plastic Pipe"; 3,323,962, "Reinforced Resinous Tubular Laminates" for use in electrical insulating, etc.; and 3,767,500, "Method of Laminating Long Strips of Various Materials".

SUMMARY OF THE INVENTION

In accordance with the present invention a composition is provided comprising plasticized sulfur wherein the composition is prepared by steps including heating the plasticized sulfur to a temperature between 160° C and 220° C and then cooling the hot plasticized sulfur in liquid form to a temperature below 160° C to thereby obtain a liquid, tacky, plasticized sulfur. Preferably the hot plasticized sulfur is cooled to a temperature below 155° C, for example a temperature of 150° C or lower. The tacky plasticized sulfur tends to stay tacky or adhesive-like for a longer length of time than does plasticized sulfur not subjected to the heating treatment in accordance with the present invention. Also, I have found that the plasticized sulfur can generally be cooled to a temperature below its normal melting point to thereby obtain a super-cooled plasticized sulfur which exhibits good adhesive properties. Further, the plasticized sulfur, especially when plasticized with dicyclopentadiene, exhibits lower viscosity at high temperatures of about 160°-220° C, preferably 170°-210° C, than does pure sulfur at these high temperatures. This makes the plasticized sulfur relatively easy to work with in obtaining the tacky, cooled plasticized sulfur composition. The relatively reduced viscosity (compared to pure sulfur) is not as reduced at the high temperature when fillers such as talc are included in the composition.

The plasticized sulfur comprises sulfur reacted with an organic compound effective to plasticize the sulfur as is described in more detail hereinbelow. Preferably the plasticized sulfur is brought to a temperature between 170° and 210° C before the cooling step, and still more preferably between 175° C and 210° C before the cooling step. Tackiness is enhanced by the inclusion of materials such as talc, mica and other finely divided mineral fillers. Tackiness for the composition having only an organic plasticizer usually does not develop unless the composition is impregnated or coated on a substrate such as paper or a paper-like material.

According to a preferred embodiment of the present invention, an adhesive composition is provided wherein the adhesive is prepared in accordance with the steps described above. It has been found especially advantageous to use the compositions of the present invention as adhesives or bonding agents after they have been cooled somewhat, and preferably while in the super-cooled liquid state, as opposed to after the compositions arrive at steady-state equilibrium and become solidified masses. Using the compositions after cooling, and preferably while super-cooled liquid, facilitates relatively easy handling at or about room temperatures of 40°-50° C, more usually about 12°-38° C.

The adhesive composition also has the advantageous properties of being usually water-tight and chemical-resistant, particularly acid-resistant.

The composition obtained via the heating procedure of the present invention is particularly advantageous in that upon cooling it retains liquid characteristics longer so that upon thermal contraction due to cooling relatively few stresses are created, compared to what would be the case with normal solidification at the normal melting point and then cooling of the solid. In such normal cooling, stresses are apt to make cracks or warp the material. Therefore, one advantageous application of the present composition is in areas where minimal cracking and the like is important. The composition is advantageously used to make castings and/or molds wherein it is desired to avoid or reduce cracking and formation of stresses upon cooling.

The composition of the present invention is also advantageously used in forming paper products, in packaging, in forming containers such as barrels or boxes, and in forming construction panels and construction members. The composition is useful as a reinforcement medium with paper and wood products as well as an adhesive and thus can advantageously be used in laminating layers of paper or paper-like material into a container wherein the adhesive composition is used to hold the paper or paper-like material together. The composition can be used as an adhesive simply to hold the layers together, but also can be used at the seams or edges of a container to hold the seams or various sides of the container together.

According to another preferred embodiment of the present invention, a laminated conduit or pipe is provided. The conduit or pipe is prepared by steps comprising laminating layers of paper or paper-like material into a conduit or shape using plasticized sulfur, preferably the plasticized sulfur adhesive composition described above, to hold the layers together.

Suitable types of paper or paper-like material which may be used for forming the conduit or pipe and also for forming other articles such as containers using the compositions of the present invention include Kraft paper, newspaper, tissue, felt, cardboard, bagasse, cotton, cloth as natural or synthetic, polypropylene felts, and fibers in woven, random or spun form.

The tacky compositions of the present invention can be advantageously used to form structures due to the adhesive character of the composition. Structural members can be bonded together using the composition and also structural members such as beams or poles can be built up using the composition as a rigidifying and bonding agent. Advantageously beams or poles and the like can be made from fibers, synthetic or natural, or wood products with the plasticized sulfur composition serving to hold the components of the member together and rigidifying the structural member.

Among other factors, the present invention is based on my finding that plasticized sulfur prepared as described herein has especially advantageous tackiness after cooling and also tends to retain tackiness even below its normal solidification temperature, and hence has resultant advantageous properties as an adhesive or bonding agent. Heating to a lower temperature — for example 150° C (302° F), typically employed in the prior art of plasticized sulfur — does not achieve the highly workable plasticized sulfur composition as in the present invention, especially the tacky, liquid composition obtained directly after the cooling in accordance with the present invention.

Although the composition of the present invention can be used after both the heating to a temperature above 160° C, and the cooling to a temperature below 160° C, the hot plasticized sulfur can also be used while it is at a high molten temperature, which may or may not be above the 160° C temperature. The hot, molten, plasticized sulfur in any case must be heated to a temperature above 160° C, and preferably above 170° C, in accordance with the present invention so that the composition of the present invention can subsequently be obtained either in situ or as a transitional composition after application of the hot plasticized sulfur to paper or other substrate. Thus, paper or other substrate can be impregnated with hot plasticized sulfur above the melting point and then cooled — for example super-cooled to below the melting point to obtain a surface still tacky or adhesive, for instance like Scotch tape. The thus-obtained surfaces are then preferably bonded together or to another object before solidification of the cooled plasticized sulfur occurs. Time limits while the material remains tacky or nonsolidified will, of course, exist and will be a function of the time and amount of heating as well as of the amount and type of plasticizer used.

The term "liquid" plasticized sulfur is used herein to embrace nonsolidifed and nonrigidifed plasticized sulfur. For example, plasticized sulfur which is still tacky or which has not solidified sufficiently to rigidify paper impregnated with the plasticized sulfur is considered to be "liquid" plasticized sulfur.

Plasticized sulfur compositions contemplated by the present invention preferably contain principally sulfur. Preferably the plasticized sulfur contains more than 50 weight percent sulfur and more preferably about 70-90 weight percent sulfur or more.

"Plasticized sulfur" as the term is used herein usually has a slightly lower melting point than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° and is then covered with a square microscope slide cover slip. The slide is transferred to a hot plate and is kept at a temperature of 78°±2° C, as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself. In one set of experiments, elemental sulfur required 0.44 minute to crystallize under the above conditions, whereas sulfur containing 3.8% of a phenolsulfur adduct as described in U.S. Pat. No. 3,892,686 required 2.9 minutes. Sulfur containing 6.6% and 9.9% of the same phenol-sulfur adduct required 5.7 and 22 minutes, respectively.

Inorganic plasticizers include iron, arsenic and phosphorus sulfides, but the particularly preferred plasticizers are organic compounds which can react with sulfur to give sulfur-containing materials, such as styrene, alphamethylstyrene, dicyclopentadiene, vinyl cyclohexene, the aromatic compound-sulfur adducts of U.S. Pat. 3,892,686 as well as the aromatic compounds used to produce these adducts, aromatic or aliphatic liquid polysulfides (e.g., those sold under the trade names of Tiokol LP-3 or LP-321), and the viscosity-control agents described in U.S. Pat. Nos. 3,674,525, 3,453,125 and 3,676,166. The preferred aromatic plasticizing compounds are styrene and the phenol-sulfur adduct of Ser. No. 344,694. The preferred aliphatic compound is dicyclopentadiene.

One preferred plasticized sulfur substance contains dicyclopentadiene, sulfur, glass fiber and talc. It has also been found that asbestos can advantageously be used instead of glass fiber in the above plasticized sulfur substance.

The elemental sulfur may be either crystalline or amorphous, and may contain small amounts of impurities such as those normally found in commercial grades of sulfur. Optimum proportions of sulfur, as well as of the other components of the composition, may vary considerably. However, proportions of sulfur of about 73 to 97%, by weight, are generally satisfactory.

Dicyclopentadiene is readily available commercially, generally at a purity of about 96% or greater. Preferably it is used in the above preferred plasticized sulfur composition in an amount of about 1 to 7% by weight.

The glass fiber of the preferred plasticized sulfur composition is preferably employed in the form of milled fibers, with the fibers generally ranging from about 1/32 inch to ¼ inch in length, preferably with an average length of about 1/16 inch. These fibers, which generally consist of high-silica glass, are readily available commercially, often coated with a starch binder. The type of glass is, however, not critical, as long as it provides the resulting composition with adequate shear strength, preferably a shear strength of about 400 to 800 psi. The glass fiber preferably constitutes about 1 to 5% by weight of the composition of the invention.

The talc used in the preferred dicyclopentadiene-sulfur-glass fiber-talc composition preferably is a foliated type, or a compact variety such as steatite. Impure varieties such as soapstone can also be used. This ingredient is preferably used in an amount of about 1 to 15% by weight of the composition, and serves the dual function of providing thixotropy to the mixture and of dispersing the glass fiber throughout the composition, thereby preventing agglomeration of the fibers.

EXAMPLES

EXAMPLE 1

A plasticized sulfur was prepared by mixing about 2 weight percent organic plasticizer, namely dicyclopentadiene, with molten sulfur.

Eight-mil-thick Kraft paper coupons were treated with the molten plasticized sulfur at various temperatures. The paper coupons were dipped into the molten plasticized sulfur and then hung up to dry by exposure to room-temperature air. The time was recorded when the first dry spot appeared, when the coupons were 50% dry, and when they were 95% dry. The term "dry" is used here to denote becoming solidified and nontacky rather than in the normal sense of drying by evaporation of a solvent.

The impregnated coupons contained about 85 weight percent plasticized sulfur. In practicing the present invention, the paper or paper-like material can be impregnated or coated with about 5 to 90 weight percent plasticized sulfur (based on the paper and plasticized sulfur), but preferably about 10 to 50 weight percent is used. Thus the 85 weight percent is somewhat higher than normal.

When the plasticized sulfur had been heated at 150° C for 1 or 2 hours, it solidified and became nontacky very rapidly when impregnated onto the paper. See Table I below.

TABLE I

Paper Impregnation at Constant Temperature

| Plasticized Sulfur Heating Time at 150° C, Hours | Drying Time, Minutes | | |
|---|---|---|---|
| | Start | 50% Dry | 95% Dry |
| 1 | Fast | Fast | 0.1 |
| 3 | 2 | 6 | 15 |
| 4 | 3 | 8 | 17 |
| 8 | 3 | 10 | 17 |

When the plasticized sulfur was heated to higher temperatures than 150° C, it took longer to dry or solidify. See Table II.

TABLE II

Paper Impregnation at Variable Temperatures

| Plasticized Sulfur Heating Steps | Elapsed Time for Heating, hours | Drying Time, minutes | | |
|---|---|---|---|---|
| | | Start | 50% Dry | 95% Dry |
| 1 hour at 160° C | 1 | 3 | 5 | 9 |
| Raise T to 170° C | 1½ | 5 | 13 | 22 |
| Take out of oven & cool to 135° C | 1⅝ | 3 | 8 | 22 |
| Raise T to 150° C | 1¾ | 4 | 16 | 30 |
| Raise T to 195° C | 2¼ | 9 | 23 | 47 |

Thus, comparing the data of Table I to Table II, it is seen that if plasticized sulfur is heated at 160°–170° C or higher, than a plasticized sulfur which gives delayed solidification is formed faster (compared to when lower heating temperatures are used); and it also gives more delayed solidification or more prolonged retention of adhesiveness or tackiness.

EXAMPLE 2

A plasticized sulfur composition containing sulfur, dicyclopentadiene, talc and glass fibers was prepared as follows:

A stainless-steel beaker equipped with a stirrer is charged with 90 parts of sulfur which is then heated until molten. While maintaining the temperature of the stirred, molten sulfur at 138° C, 1.8 parts of dicyclopentadiene is added. After 10 minutes of reaction time, 6.4 parts of talc (Mistron Vapor talc) is added. Then, after the talc is well mixed in, 1.8 parts of 0.25 inch milled glass fiber (Owens-Corning No. 630 glass fiber) is added. Stirring at 138° C is then continued for an additional ½ hour. Upon cooling to room temperature, this material forms a hard, opaque mass which can be broken into smaller pieces for ease of handling.

The plasticized sulfur composition obtained as above-described was used in the construction of a container, in particular the construction of a box which had a substantial degree of water-tightness retention ability. Thus, about 2 grams of plasticized sulfur was placed on a hot plate and heated to a temperature of about 185° C. The molten material was spread out with a spatula to a thickness of about 1/64 inch. Then a 4 inch × 4 inch piece of Kraft bag paper was placed on the molten, highly viscous plasticized sulfur and was gently pressed down with the spatula over its surface. Then, while still in place on the hot plate, a second 2 grams of plasticized sulfur was placed on top of this Kraft paper and was allowed to melt. This material was likewise spread over the entire upper surface of the paper. Then a second 4 inch × 4 inch piece of Kraft bag paper was placed on the molten, highly viscous plasticized sulfur and was gently pressed down with the spatula over its surface. Then, while still in place on the hot plate, a second 2 grams of plasticized sulfur was placed on top of this Kraft paper and was allowed to melt. This material was likewise spread over the entire upper surface of the paper. Then a second 4 inch × 4 inch piece of Kraft bag paper was placed over the first and pressed down with a spatula. Finally, a third 2-gram portion of plasticized sulfur was placed on the top of the 2 plies of paper and allowed to melt and spread.

While still hot (about 185° C), the plasticized sulfur-impregnated 2-ply paper laminate was removed from the hot plate and cooled to room temperature in about 10 seconds. The laminate was plastic and was sticky on both surfaces. It was formed into a box by folding the sides up and lapping the corners. The seams were closed by squeezing the edges together. This box held water without leakage for more than 24 hours.

Example 3

The plasticized sulfur of Example 2 was utilized to form a laminate from 12 plies of newspaper, about 3 inch × 3 inch, by the same technique as described in Example 2. After the 12-ply laminate was removed from the hot plate and rapidly cooled to 20° C, it was rolled into a tube which was sealed by pressing the edges together with about a ⅛ inch overlap. After about ½ hour, the tube lost its plasticity and set to a rigid tubular structure. The tube was unaffected by immersion in water.

What is claimed is:

1. In a paper or paper-like product comprising layers laminated together by a plasticized sulfur adhesive, the improvement which comprises preparing the plasticized sulfur adhesive by heating to a temperature between 160° C and 220° C to obtain a molten, low viscosity adhesive.

2. A paper or paper-like product in accordance with claim 1 wherein the plasticized sulfur comprises a plasticizer selected from the group consisting of dicyclopentadiene, aliphatic polysulfides, aromatic polysulfides, or mixtures thereof.

3. A paper or paper-like product in accordance with claim 1 wherein the plasticized sulfur comprises sulfur, dicyclopentadiene, asbestos or glass fiber, and talc.

4. A paper or paper-like product in accordance with claim 1 wherein the plasticized sulfur is heated to a temperature between 175° C and 210° C.

5. In a paper or paper-like product comprising layers laminated together by a plasticized sulfur adhesive, the improvement which comprises preparing the plasticized sulfur adhesive by (1) heating to a temperature between 160° and 220° C to obtain a molten, low viscosity plasticized sulfur, and (2) cooling the hot plasticized sulfur in liquid form to a temperature below 150° C to obtain a liquid adhesive.

6. A paper or paper-like product in accordance with claim 5 wherein the plasticizer sulfur is heated to a temperature between 175° C and 210° C.

7. A paper or paper-like product in accordance with claim 5 wherein the hot plasticized sulfur is cooled to a temperature below its normal melting point.

* * * * *